INVENTORS
MAYNARD K. BECKMAN JR.
RICHARD S. MUKA
BY
Anthony W. Cennamo
ATTORNEY

INVENTORS
MAYNARD K. BECKMAN JR.
RICHARD S. MUKA
BY
Anthony D. Cennamo
ATTORNEY

INVENTORS
MAYNARD K. BECKMAN JR.
RICHARD S. MUKA

BY

ATTORNEY

INVENTORS
MAYNARD K. BECKMAN JR.
RICHARD S. MUKA
BY Anthony D. Cennamo
ATTORNEY

United States Patent Office 3,416,791
Patented Dec. 17, 1968

3,416,791
DOCUMENT INVERTING APPARATUS
Maynard K. Beckman, Jr., and Richard S. Muka, Rochester, N.Y., assignors to Xerox Corporation, Rochester, N.Y., a corporation of New York
Filed Feb. 2, 1967, Ser. No. 613,487
2 Claims. (Cl. 271—65)

ABSTRACT OF THE DISCLOSURE

Apparatus for selectively inverting the facing position of a conveyed document in which a document is inserted into a receiving chute from the normal path of travel, leading edge first, and withdrawn therefrom into the normal path of travel with the trailing edge becoming the leading edge. A document thus inverted is deflected into the receiving chute by a pivotal member selectively positioned to project into the normal path of travel. The document is withdrawn from the receiving chute and inserted into the normal path of travel by a rotating friction roller which projects into the chute and contact rollers movable into the chute to hold the document in engagement with the friction roller. Movement of the contact rollers is effected by a solenoid through a linkage arrangement in response to a sensing unit detecting a leading edge of a document in the chute at a predetermined position.

BACKGROUND OF THE INVENTION

This invention relates generally to material handling devices and more particularly to apparatus for inverting the facing position of a conveyed document.

In material handling operations, it sometimes becomes desirable or necessary to reverse the facing position of the conveyed article. This is especially true in cases where the conveyed articles comprise documents or other record media. For example, in some printing operations it may be necessary to print upon one side of the record medium during a first run and on the opposite side of the medium during a second run. Depending upon the types of feeding and stacking apparatus being utilized, it may therefore be necessary to manually re-arrange the order of the record medium prior to commencing a run to insure printing in the proper sequence. To eliminate the need for manually re-arranging the order of the record medium would result in time saved and reduced cost in the operation.

In other situations, such as copying or reproducing machines for example, it is highly desirable at the end of a copying operation to have the originals and copies stacked in a particular sequential order irrespective of the initial sequence of the originals. In most machines the order in which both originals and duplicates are delivered to the respective receiving stations is wholly dependent upon the initial sequence of the originals. That is, if a stack of documents enter the machine in a particular order, the documents coming from the machine will be stacked in a particular order dependent upon the entering sequential order. It would therefore be advantageous to have a copying machine which supplied the originals or copies in a selected order independent of the order in which the originals entered the machine.

This is especially true where copies are to be made from large stacks of documents such as fan folded computer forms, for example. Fan folded forms consist of continuous web material which is folded in a zigzag manner into a stack. At times, the quantity of material being utilized is quite large, yielding very large and heavy stacks which are cumbersome and difficult to handle.

In machines designed for copying such forms, one end of the web material is placed in the advancing mechanism of the copying machine and copies are produced of successive forms as the web is advanced. In such machines sorters or stackers may be provided for stacking the copies produced in a particular order. However, the order obtained is dependent upon the order in which the web is initially started in the machine. For example, in a particular operation, if the first form on the web is initially started in the machine, a stack of correctly oriented copies will be obtained with the copies arranged in consecutive ascending numerical order beginning with the first form. However, if the last form on the web is initially started in the machine first, the stack of copies obtained will not be correctly oriented and will be arranged in consecutive descending numerical order beginning with the last form. In the latter instance, the operator must therefore manually rearrange all of the copies in sequence to obtain the proper numerical order with the correct orientation. It is therefore highly desirable to be able in one instance to feed the web into the machine from the end having the first form thereat and receive copies correctly oriented in consecutive ascending numerical order from the beginning and in the next instance to feed the web into the machine from the end having the last form thereat and still receive copies correctly oriented in consecutive ascending numerical order from the beginning. This may be accomplished by providing a document inverter in the copying machine which selectively inverts or overturns documents at some point before reaching the sorter or stacker.

*Summary of the invention*

Accordingly, it is an object of the invention to invert the facing position of conveyed documents.

Another object of the invention is to provide apparatus which inverts the facing position of conveyed documents.

Another object of the invention is to provide apparatus which selectively inverts the facing position of conveyed documents.

Another object of the invention is to provide apparatus for selectively inverting the facing position of conveyed documents by inserting the documents from the normal path of travel into a receiving chute, leading edge first, and withdrawing the documents from the receiving chute into the normal path of travel trailing edge first.

Another object of the invention is to provide apparatus adapted for use in copying machines whereby stacks of copies may be obtained from a machine independent of the order in which original documents are fed into the machine.

These and other objects are attained by providing means forming an alternate path of travel diverging from a normal path of travel, means for deflecting a conveyed document from the normal path of travel into the alternate path of travel, sensing means for detecting a document in the alternate path of travel, and means responsive to the sensing means for returning a document from the alternate path of travel to the normal path of travel in a reversed orientation. Other objects of the invention will become readily apparent to those skilled in the art in view of the following detailed disclosure and description thereof especially when read in conjunction with the accompanying drawings.

*Description of the preferred embodiments*

Figure 1:
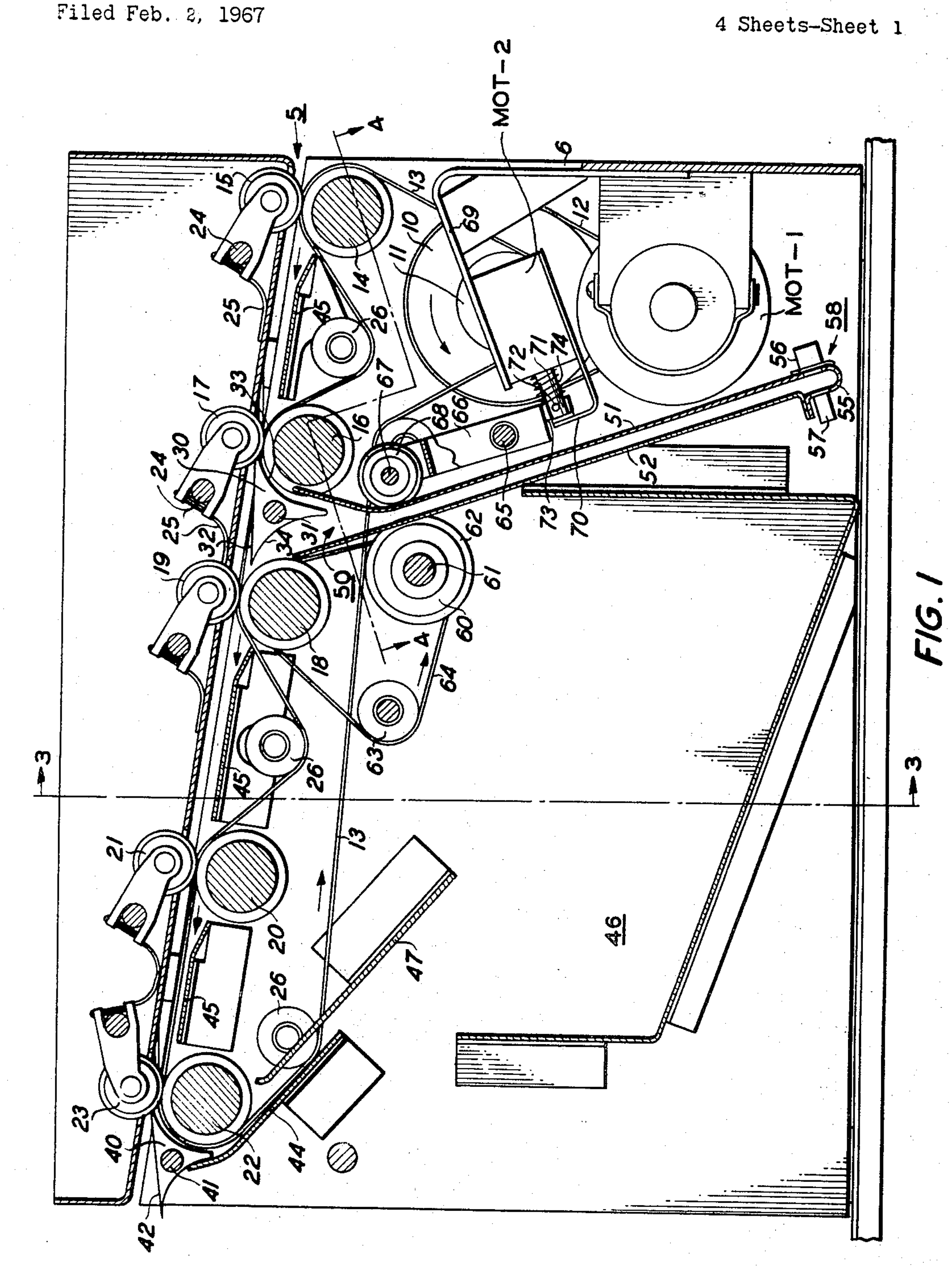
FIG. 1 is a longitudinal cross sectional view of a document transport mechanism illustrating the document inverting apparatus.
Figure 2:
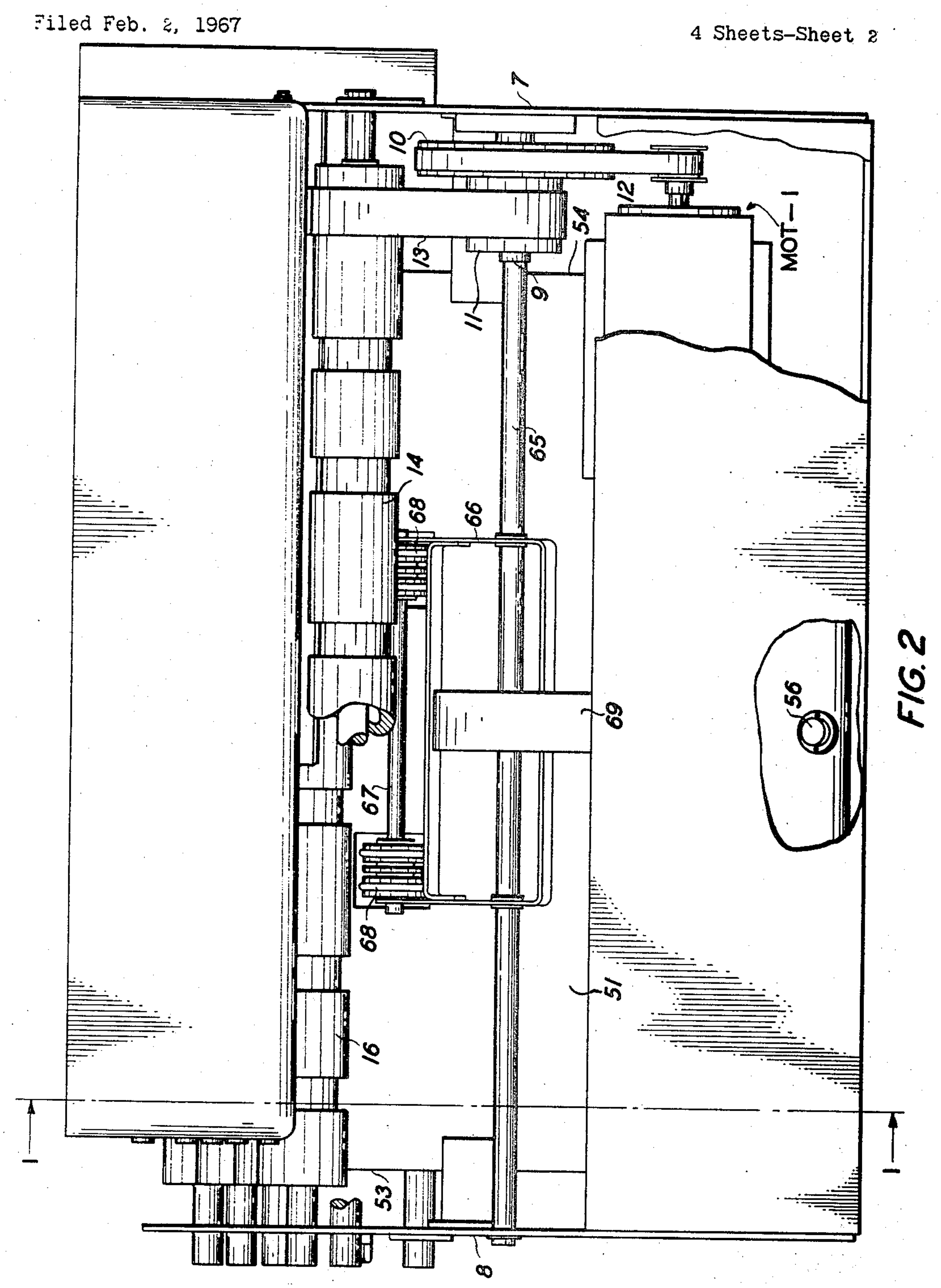
FIG. 2 is an end view of the document inverting apparatus as viewed from the right in FIG. 1.
Figure 3:
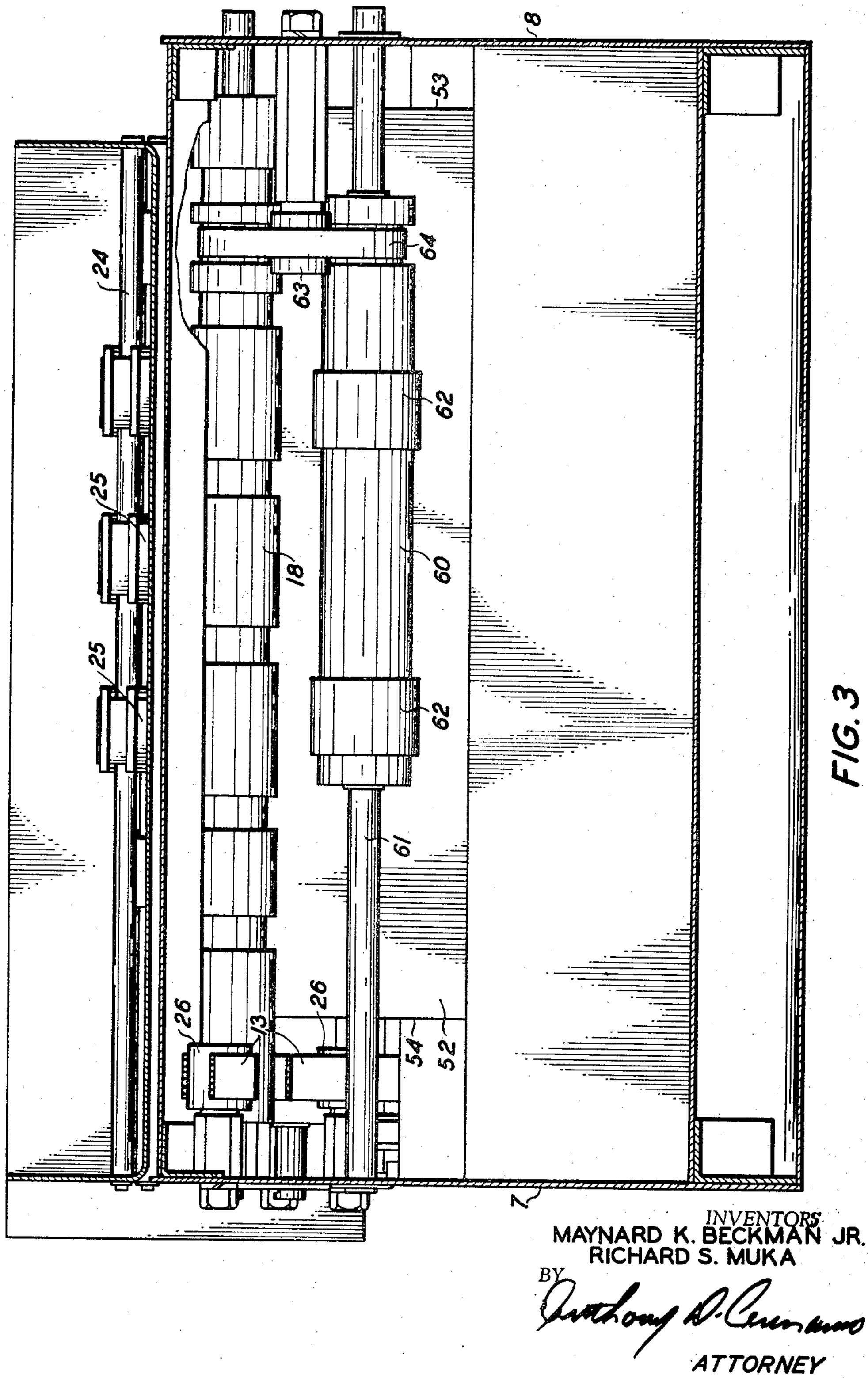
FIG. 3 is an end view of the document inverting apparatus taken along the lines 3—3 of FIG. 1.
Figure 4:
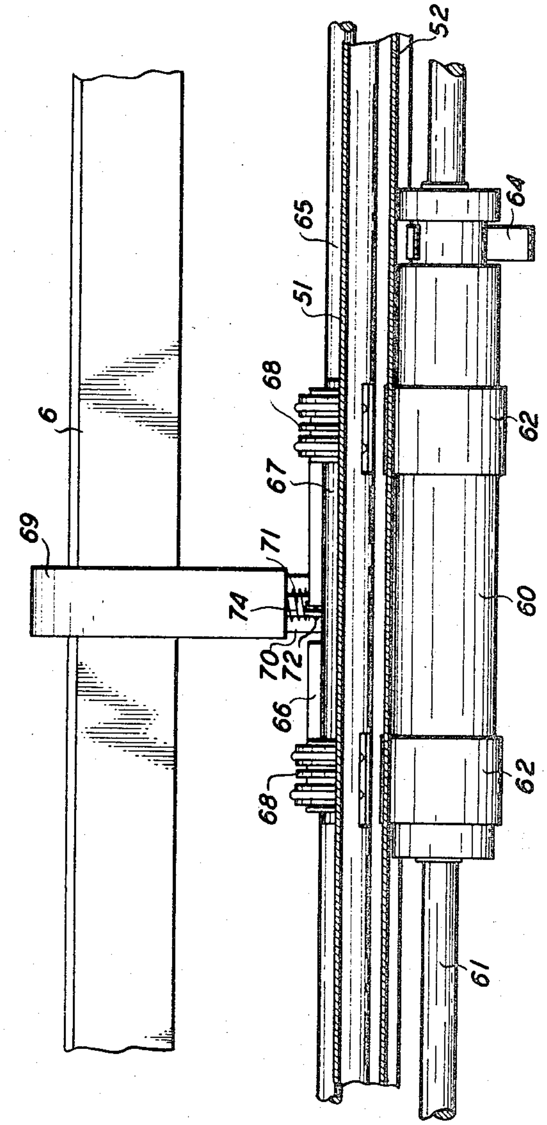
FIG. 4 is a top cross-sectional view of the document inverting apparatus taken along the lines 4—4 of FIG. 1.

Referring to FIG. 1, the document inverting apparatus is particularly adapted for use in connection with the paper transport system of a copying machine. As shown therein, copies after being produced enter the transport mechanism at 5 and are transported from the copy making apparatus in the direction of the arrows to a sorter or stacker. A copy entering the transport mechanism is directed to pass between the first in a series of feed rollers 14, 16, 18, 20 and 22 and contact rollers 15, 17, 19, 21 and 23. Feed rollers 14, 16, 18, 20 and 22 are rotatably mounted along the document feed path and driven by a motor generally designated MOT–1. In the particular arrangement illustrated MOT–1 drives a pulley 10 rotatably mounted on stud shaft 9 and connected to side frame 7 via flexible drive belt 12. A second flexible drive belt 13 passes over pulley 11 mounted on stud shaft 9 and connected with pulley 10 which drives feed rollers 14, 16, 18, 20 and 22. Flexible drive belt 13 passes over a plurality of idler pulleys 26 positioned to provide sufficient frictional contact between drive belt 13 and the drive rollers and to provide proper tension in the belt.

Contact rollers 15, 17, 19, 21 and 23 are pivotally mounted about shafts 24 located above the document feed path and resiliently biased into contact with the respective feed rollers via springs 25.

Paper guide plates 45 are positioned between feed rollers 14 and 16, 18 and 20, and 20 and 22 to guide and support a conveyed document between the respective feed rollers.

A pivotal member 30 pivoted about shaft 31 and having a flat extended surface 32 is positioned between feed rolls 16 and 18 adjacent the document feed path. Pivotal member 30 is movable from a first position in which flat surface 32 is parallel to and substantially aligned with paper guide plates 45, to a second position as shown in FIG. 1, the purpose of which will hereinafter be more fully explained.

A second pivotal member 40 pivoted about shaft 41 and having a flat extended surface 42 is positioned after feed roller 22 adjacent the document feed path and is movable from a first position in which flat surface 42 is parallel to and substantially aligned with paper guide plates 45 to a second position as shown in FIG. 1.

With pivotal member 30 in the first aforementioned position, a document entering the transport mechanism passes between feed roller 14 and guide rollers 15, thence advanced over guide plate 45 to pass between feed roller 16 and contact rollers 17, thence advanced over the flat surface 32 of pivotal member 30 to feed roller 18 and so on until passing between feed roller 22 and contact rollers 23. At this point, with pivotal member 40 in the first aforementioned position the document would be advanced over flat surface 42 to a document sorting apparatus (not shown). With pivotal member 40 in the second position as shown in FIG. 1, the document is deflected downwardly by pivotal member 40 between guide plates 44 and 47 and discharged into catch bin 46.

Pivotal member 30 comprising a portion of the document inverting apparatus may be positioned between the two aforementioned positions by manually operated apparatus selectively positioned by the machine operator or by automatic or semi-automatic apparatus selected by the machine operator. Pivotal member 30 may preferably have a general cross sectional configuration as shown in FIG. 1 with a first curved deflecting surface 33 spaced slightly from but conforming to the same general curvature of feed roller 16 and a second deflecting surface 34 likewise curved but to a somewhat different degree and spaced further from feed roller 18 to facilitate operating clearances.

A receiving chute 50 forms a closed path of travel for documents divergent from the path of travel through which a conveyed document would normally follow in the transport system. Receiving chute 50 comprises a pair of flat plates 51 and 52 generally parallelly spaced from each other and extending downwardly from feed rollers 16 and 18. Plate 52 preferably comprises a straight flat surface throughout its length and is tangentially aligned with feed roller 18. Plate 51 may be curved at the upper end thereof to align tangentially with feed roller 16 forming a widened throat for receiving chute 50. A second pair of plates 53 and 54 connected between plates 51 and 52 form the side enclosures for receiving chute 50. The lower end of chute 50 may be closed by a curved end plate 55 connected to side plates 53 and 54 and flat plates 51 and 52.

A sensing unit generally designated 58 is located near the lower end of chute 50 for sensing the leading edge of a document contained therein. Sensing unit 58 may comprise a photodetector cell 56 and a light source 57 as illustrated in FIG. 1. Photodetector cell 56 is connected to a solenoid unit generally designated MOT–2 whereby upon detection of a leading edge of a document in chute 50 solenoid MOT–2 is activated as will be hereinafter more fully explained.

A document retracting roller 60 is rotatably mounted at one side of receiving chute 50 on shaft 61 which extends between side frames 7 and 8 of the transport mechanism. Retracting roller 60 is mounted with the surface thereof in close proximity to and parallel with flat plate 52. Friction members 62 positioned on retracting roller 60 project through suitably positioned cutouts in flat plate 52 and extend into receiving chute 50. Retracting roller 60 and friction members 62 are driven in a timed relationship with the transport mechanism via flexible drive belt 64 connected to feed roller 18 and passing over idler pulley 63 which is rotatably mounted on side frame 8 of the transport system.

A contact roller assembly is pivotally mounted at the side of receiving chute 50 opposite from retracting roller 60. Shaft 65 is mounted parallel to flat plate 51 between side frames 7 and 8 of the transport system. Roller frame 66 is pivotally mounted on shaft 65 and carries a second shaft 67 at the upper ends thereof parallel to flat plate 51. Contact rollers 68 rotatably mounted on shaft 67 are aligned with friction members 62 on retracting roller 60. Solenoid, MOT–2, is connected to end frame 6 of the transport system via mounting bracket 69. Armature 71 of solenoid MOT–2 is connected to the lower end of roller frame 66 via pivot pin 72 in frame projection 73. An armature limiting plate 70 connected to solenoid MOT–2 extends into the path of movement of armature 71 for limiting the displacement of armature 71 in the direction to the left, as viewed in FIG. 1. Armature 71 in the de-energized state is normally biased against limit plate 70 by a spring 74. Upon energization of solenoid MOT–2 rollers 68 are moved through suitably arranged cutouts in flat plate 51 into chute 50 by frame assembly 66 to contact friction members 62 on retracting roller 60. Upon de-energization of solenoid MOT–2 rollers 68 are withdrawn from chute 50 by the bias normally acting against armature 71.

Thus, it may be seen that to invert the facing position of a document entering at 5 in the normal path of travel of the transport mechanism, pivotal member 30 is positioned as shown in FIG. 1 As a document having the information thereon facing upwardly as viewed in FIG. 1, passes between feed roller 16 and contact rollers 17, it is deflected downwardly by the curved surface 33 of pivotal member 30 which extends into the normal path of travel. As the document is advanced by feed roller 16, the leading edge passes into the throat and downwardly into the receiving chute 50. When the leading edge of the deflected document reaches sensing unit 56, interrupting the beam from light source 57, solenoid MOT–2 is activated by the detected edge through the photodetector cell 56 thereby pivoting frame assembly 66 and contact rollers 68 toward retracting roller 60. With the leading edge of a deflected document against end plate 55, the trailing edge extends above retracting roller 60 and contact rollers 68. Thus, as contact rollers 68 are moved to engage the frictional members 62 on rotating retracting roller 60, the deflected document is grasped between the respective rollers and advanced upwardly. The edge of the document which had formerly been the trailing edge thus now becomes the leading edge. This edge then engages the second curved surface 34 of pivotal member 30 which deflects the edge toward the bites of feed roller 18 and contact rollers 19. As the edge passes between feed roller 18 and contact rollers 19, armature 71 of solenoid MOT–2 is released by sensing unit 56 and the document is pulled back into the normal path of travel by the transport mechanism, the information now on the document facing downwardly as viewed in FIG. 1.

Thus, if an operator wishes to make copies from a series of fan folded forms and the web is initially started in the copying machine beginning with the first form on the web, the document inverter would not be utilized. The copies thus made, for example, would be transported across flat surface 32 of pivotal member 30 and subsequently deposited into catch bin 46 with the information thereon facing downwardly, in ascending order from the first document copied. After this operation, however, the fan folded web would be stacked with the last form at the top of the stack. In a subsequent operation, the fan folded web material may be initially started in the machine with the last form first. By positioning pivotal member 30 in the deflecting position, the copies thus made are inserted into the receiving chute 50 with the information contained thereon facing flat plate 52. By utilizing the document inverter the copies are subsequently discharged into catch bin 46 with the information contained thereon facing upwardly in descending order from the first document copied.

Thus, in either case, at the end of an operation, a stack of copies is obtained which is arranged in ascending consecutive numerical order and which does not necessitate further arranging by the operator. Through this simple, yet effective arrangement, a stack of copies may be obtained in a desired order independent of the order in which original documents enter the machine.

While the invention has been described with reference to the structure disclosed herein, it is not confined to the details set forth, and this application is intended to cover such modifications or changes as may come within the purposes of the improvements or the scope of the following claims.

What is claimed is:

1. A document inverting apparatus adapted for use in document conveying systems having means defining a normal path of travel along which a conveyed document is advanced comprising, a chute diverging from said normal path of travel for receiving a document, a pivotal member interposed adjacent the normal path of travel at the entrance to said chute and movable between document deflecting and non-deflecting positions, said pivotal member including a first projection extending into said normal path of travel when in a deflecting position for diverting the leading edge of a conveyed document from said normal path of travel into said chute and a second projection extending from said chute toward said normal path of travel for diverting the trailing edge of documents from said receiving chute to said normal path of travel when said pivotal member is in both the document deflecting and non-deflecting positions, means for selectively positioning said pivotal member in said document deflecting and non-deflecting positions, rotatable friction drive means at one side and extending into said chute for removing a document therefrom in inverted orientation, roller means at one side of said chute opposite said friction drive means and pivotably movable into said chute for holding a document in contact with said friction drive means, sensing means for detecting a document at a predetermined position in said chute, and electromagnetic drive means operatively connected to said roller means for pivoting said roller means into said chute in response to the detection of a document at said predetermined position therein by said sensing means.

2. In a document conveying apparatus having means defining a normal path of travel along which documents are advanced, a document inverting apparatus comprising, a document receiving chute positioned along said normal path of travel and diverging therefrom to form an alternate dead end path, a pivotal member positioned adjacent the normal path of travel at the entrance to said document receiving chute and movable between document deflecting and non-deflecting positions, said pivotal member including a first deflecting surface extending into said normal path of travel when in a deflecting position for interrupting advancement of a document along said normal path of travel and for diverting the leading edge of such interrupted documents from said normal path into said receiving chute, and a second deflecting surface extending from said receiving chute toward said normal path of travel for diverting the trailing edge of such diverted documents from said receiving chute into said normal path of travel when said pivotal member is in both the document deflecting and non-deflecting positions, means for selectively positioning said pivotal member in said document deflecting and non-deflecting positions, first roller means at one side and extending into said chute for conveying documents from said chute toward said normal path of travel, second roller means at one side of said chute opposite said first roller means pivotably movable into said chute to an operative position engageable with said first roller means, electromagnetic drive means for pivoting said second roller means into said chute to the operative position, drive means operatively connecting said roller means when in the operative position to advance documents from within said receiving chute toward said normal path of travel, and sensing means responsive to a document reaching a predetermined position in said receiving chute for activating said electromagnetic drive means engaging a document between said first roller means and said second roller means whereby an engaged document is advanced from within said receiving chute into said normal path of travel in an inverted orientation.

References Cited

UNITED STATES PATENTS

| | | | |
|---|---|---|---|
| 2,472,931 | 6/1949 | Yohn. | |
| 2,901,246 | 8/1959 | Wagner | 271—65 X |

EVON C. BLUNK, *Primary Examiner.*

R. J. HICKEY, *Assistant Examiner.*

U.S. Cl. X.R.

271—3